(12) United States Patent
Nakai et al.

(10) Patent No.: US 11,267,046 B2
(45) Date of Patent: Mar. 8, 2022

(54) HOT ISOSTATIC PRESSING DEVICE

(71) Applicant: KOBE STEEL, LTD., Hyogo (JP)

(72) Inventors: Tomomitsu Nakai, Takasago (JP); Katsumi Watanabe, Takasago (JP); Itaru Masuoka, Takasago (JP); Makoto Yoneda, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 281 days.

(21) Appl. No.: 16/499,425

(22) PCT Filed: Mar. 27, 2018

(86) PCT No.: PCT/JP2018/012257
§ 371 (c)(1),
(2) Date: Sep. 30, 2019

(87) PCT Pub. No.: WO2018/186229
PCT Pub. Date: Oct. 11, 2018

(65) Prior Publication Data
US 2020/0025446 A1    Jan. 23, 2020

(30) Foreign Application Priority Data
Apr. 7, 2017 (JP) .............................. JP2017-076631

(51) Int. Cl.
*B22F 3/15* (2006.01)
*B22F 3/00* (2021.01)
(Continued)

(52) U.S. Cl.
CPC ............... *B22F 3/15* (2013.01); *B22F 3/003* (2013.01); *B30B 11/002* (2013.01);
(Continued)

(58) Field of Classification Search
CPC ...... B22F 3/003; B22F 3/15; B22F 2003/153; B30B 5/02; B30B 11/002; B30B 15/34;
(Continued)

(56) References Cited

U.S. PATENT DOCUMENTS 6,250,907 B1    6/2001 Bergman
6,331,271 B1    12/2001 Bergman
(Continued)

FOREIGN PATENT DOCUMENTS

| EP | 0866740 A1 | 9/1998 |
| JP | H01-230984 A | 9/1989 |
| JP | H04-80592 A | 3/1992 |

OTHER PUBLICATIONS

The extended European search report issued by the European Patent Office dated Jul. 10, 2020, which corresponds to European Patent Application No. 18781014.4-1103 and is related to U.S. Appl. No. 16/499,425.

*Primary Examiner* — Steven B McAllister
*Assistant Examiner* — Benjamin W Johnson
(74) *Attorney, Agent, or Firm* — Studebaker & Brackett PC

(57) ABSTRACT

Provided is a hot isostatic pressing (HIP) device that improves the heat uniformity of a hot zone during a pressurization process of an object being processed. This HIP device (100) is provided with: an outer casing (4) having an open outer opening part (4H); an inner casing (5) having an open inn opening part (5H); a heat-insulating body (R) disposed between the outer casing (4) and the inner casing (5); a gas flow generation part (30); and a plurality of first gas conduits (12), A hot zone (P) in which a pressurization process is performed is formed inside the inner casing (5). During the pressurization process, a low-temperature pressurization medium gas which has been generated by the gas flow generation part (30) and has passed through the first gas (Continued)

conduits (12) moves upward in an inner flow passage (L1) between the casings, and then flows into the hot zone (P) from the inner opening part (5H), Even when the pressurization medium gas leaks from the vicinity of a bottom all part (20) and flows into the hot zone (P), the heat uniformity of the hot zone (P) is maintained.

9 Claims, 11 Drawing Sheets

(51) Int. Cl.
  *C04B 35/645* (2006.01)
  *F27B 9/12* (2006.01)
  *F27D 3/00* (2006.01)
  *F27D 7/06* (2006.01)
  *B30B 11/00* (2006.01)
  *F27D 5/00* (2006.01)
  *F27B 5/16* (2006.01)
  *F27D 7/02* (2006.01)
  *B30B 15/34* (2006.01)
  *B30B 5/02* (2006.01)
  *F27B 17/00* (2006.01)

(52) U.S. Cl.
  CPC ............ *C04B 35/6455* (2013.01); *F27B 9/12* (2013.01); *F27D 3/0021* (2013.01); *F27D 7/06* (2013.01); *B22F 2003/153* (2013.01); *B30B 5/02* (2013.01); *B30B 15/34* (2013.01); *F27B 5/16* (2013.01); *F27B 17/0016* (2013.01); *F27B 2009/124* (2013.01); *F27D 5/0031* (2013.01); *F27D 7/02* (2013.01)

(58) Field of Classification Search
  CPC .......... C04B 35/6455; F27B 5/16; F27B 9/12; F27B 17/0016; F27B 2009/124; F27D 3/0021; F27D 5/0031; F27D 7/02; F27D 7/06
  USPC .......................................................... 432/77
  See application file for complete search history.

(56) References Cited

U.S. PATENT DOCUMENTS

| | | | |
|---|---|---|---|
| 6,514,066 B1 * | 2/2003 | Bergman | B30B 11/002 425/405.2 |
| 7,011,510 B2 * | 3/2006 | Nakai | B22F 3/15 219/400 |
| 2013/0071508 A1 | 3/2013 | Nakai et al. | |
| 2013/0344451 A1 * | 12/2013 | Gardin | B30B 11/002 432/29 |
| 2016/0348969 A1 * | 12/2016 | Katsumata | C21D 1/773 |

* cited by examiner

HOT ISOSTATIC PRESSING DEVICE

TECHNICAL FIELD

The present invention relates to a hot isostatic pressing device.

BACKGROUND ART

Typically, in a hot isostatic pressing method (a HIP method: a press method using a hot isostatic pressing device), a workpiece such as a sintered product (e.g., ceramics) or a casted product is heated and processed to a high temperature equal to or higher than a recrystallization temperature under pressure-medium gas atmosphere set to a high pressure of several tens to several hundreds of MPa. Such a method is characterized in that residual pores in the workpiece can be eliminated.

Such a typical hot isostatic pressing device has a high-pressure container, an inverted cup-shaped heat insulating layer arranged in the high-pressure container, a heating element arranged in the heat insulating layer, and a product table on which the workpiece is mounted. The heating element generates heat to form a hot zone for processing the workpiece in the heat insulating layer. An upper portion of the heat insulating layer is closed, and a lower portion of the heat insulating layer opens. As a result, the inside of the hot zone during pressing processing is maintained at high temperature as in a hot-air balloon. Meanwhile, the technique of rapidly cooling the inside of the high-pressure container after the processing for the workpiece to shorten processing time in this hot isostatic pressing device has been known.

Patent Document 1 discloses the technique of rapidly cooling the inside of a hot isostatic pressing device after processing for a workpiece in such a device. The hot isostatic pressing device includes a cooling mechanism. The cooling mechanism forms a cooling gas flow circulating inside and outside a heat insulating layer. The cooling mechanism includes a gas passage arranged below the heat insulating layer and formed to penetrate the inside and outside of the heat insulating layer in a radial direction, a gas ascending flow path formed in a hot zone, a fan configured to generate a gas flow, a valve configured to control the gas flow, and a bottom wall portion. In this technique, an opening is formed at an upper portion of the inverted cup-shaped heat insulating layer, and the valve is arranged so that the opening can be opened or sealed. Moreover, the bottom wall portion is connected to a lower portion of the heat insulating layer to separate the hot zone and a furnace floor portion housing, e.g., the fan. A seal configured to prevent gas leakage is arranged between the bottom wall portion and the heat insulating layer. During pressing processing for the workpiece, the valve closes the opening to form the hot zone inside the heat insulating layer. On the other hand, upon cooling, the valve opens the opening. Then, cooling gas introduced into a lower portion of the hot zone through the gas passage cools the heat insulating layer while ascending in the gas ascending flow path in the hot zone, and thereafter, is released through the opening.

CITATION LIST

Patent Document

Patent Document 1: JP 2013-178070 A

SUMMARY OF THE INVENTION

In the hot isostatic pressing device including a rapid cooling function as described above, slight gas inflow/outflow (gas leakage) easily occurs at a clearance between the valve and the opening or a seal portion of the bottom wall portion due to long-term device use. When low-temperature gas flows into the hot zone from the periphery of the bottom wall portion during the pressing processing for the workpiece, the temperature of the lower portion of the hot zone becomes lower than that of an upper portion of the hot zone. As a result, there are problems that thermal uniformity in the hot zone is degraded and processing performance for the workpiece is lowered.

The present invention is intended to improve, in a hot isostatic pressing device including a structure in which a lower end portion of a casing forming a hot zone is closed by a bottom wall portion, thermal uniformity in the hot zone during pressing processing for a workpiece.

Provided is a hot isostatic pressing device for performing isostatic pressing processing for a workpiece by means of pressure-medium gas. The hot isostatic pressing device includes a high-pressure container, an inner casing, a heat insulating body, an outer casing, a heating unit, a bottom wall portion, multiple communication pipes, multiple introduction pipes, and a gas flow generation unit. The high-pressure container includes an inner peripheral surface extending along an upper-to-lower direction, and a body internal space defined by the inner peripheral surface is formed inside the high-pressure container. The inner casing is arranged in the body internal space, and includes a gas-impermeable inner peripheral wall portion extending along the upper-to-lower direction to surround a hot zone for pressing the workpiece. An inner opening allowing permeation of the pressure-medium gas opens at an upper portion of the inner casing. The heat insulating body is a gas-impermeable heat insulating body arranged to surround the inner casing in the body internal space. The heat insulating body has a heat insulating body peripheral wall portion extending along the upper-to-lower direction to surround the inner peripheral wall portion through a pressure-medium gas passage, and a heat insulating body upper wall portion connected to the heat insulating body peripheral wall portion to close an upper portion of the heat insulating body peripheral wall portion and arranged above the inner opening through the pressure-medium gas passage. The outer casing is arranged to surround the heat insulating body in the body internal space. The outer casing includes a gas-impermeable outer peripheral wall portion extending along the upper-to-lower direction to surround the heat insulating body peripheral wall portion through the pressure-medium gas passage, and an outer opening allowing permeation of the pressure-medium gas opens at an upper portion of the outer casing. The heating unit is arranged in the hot zone to generate heat. The bottom wall portion includes a support portion supporting a lower end portion of the outer peripheral wall portion, a lower end portion of the inner peripheral wall portion, and a lower end portion of the heat insulating body peripheral wall portion, and a mount portion defining a lower portion of the hot zone and having an upper portion allowing mounting of the workpiece. The bottom wall portion seals the hot zone from below. The multiple communication pipes are blocked from a space between the inner peripheral wall portion and the heat insulating body peripheral wall portion, and each form the pressure-medium gas passage penetrating the heat insulating body peripheral wall portion to allow a space between the heat insulating body peripheral wall portion and the outer peripheral wall portion and a lower end portion of the hot zone to communicate with each other. The multiple introduction pipes allow a lower portion of the space between the inner peripheral wall portion and the heat insulating body peripheral wall portion and a portion of the body internal space below the bottom wall portion to communicate with each other. The gas flow generation unit is arranged below the bottom wall portion in the body internal space, and is configured to generate a pressure-medium gas flow flowing into the multiple introduction pipes upon pressing processing for performing the isostatic pressing processing for the workpiece mounted on the mount portion.

DESCRIPTION OF EMBODIMENTS

Figure 1:
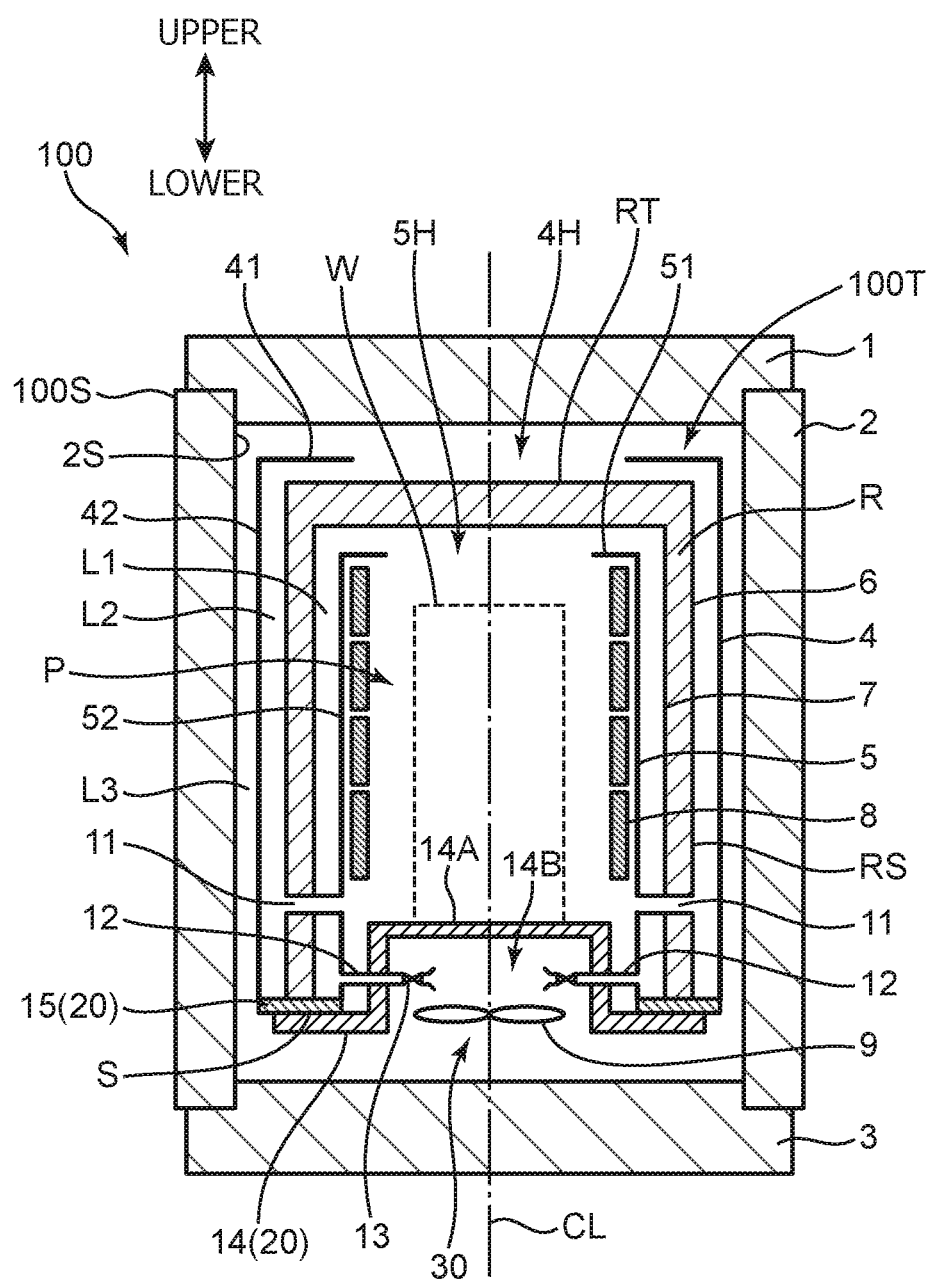
FIG. 1 is a sectional view of a hot isostatic pressing device according to one embodiment of the present invention.
Figure 2:
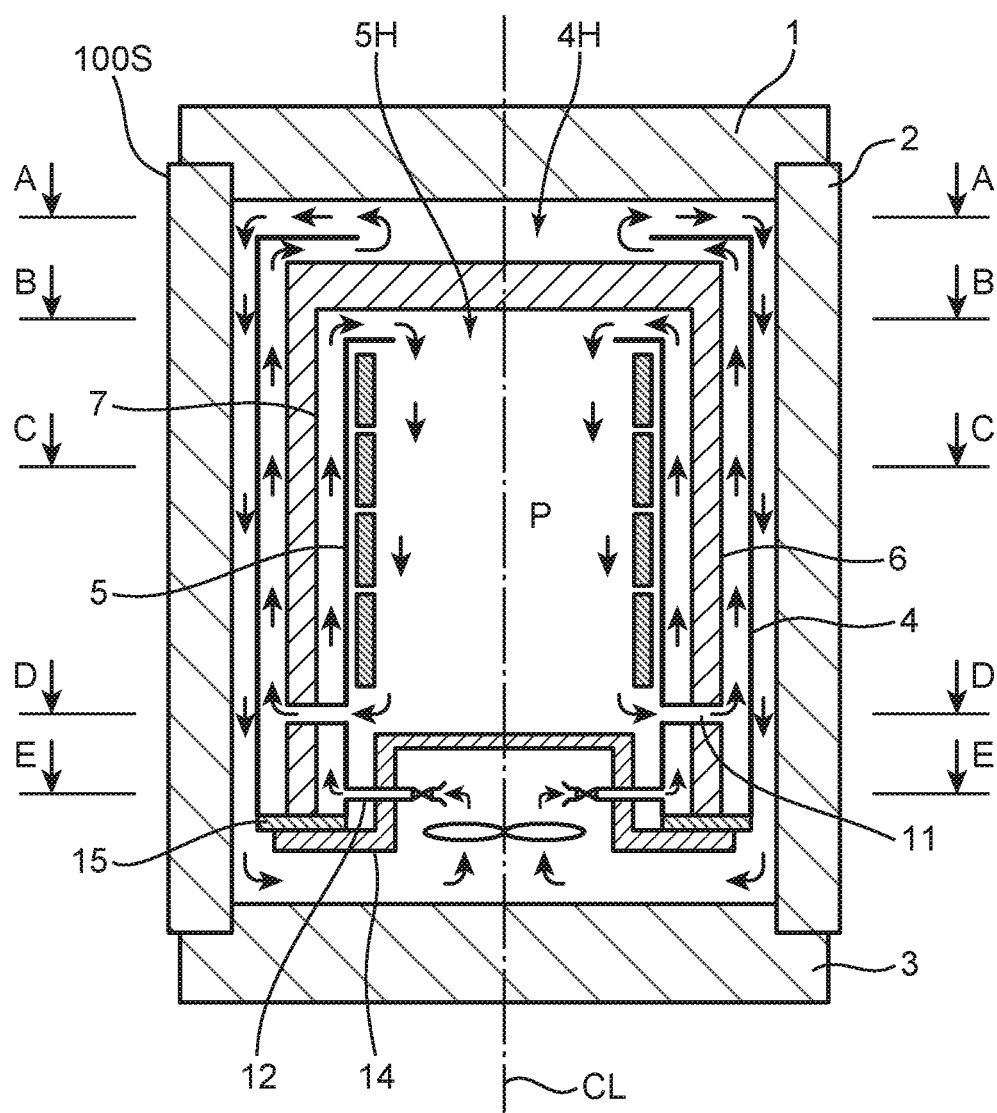
FIG. 2 is a sectional view of a pressure-medium gas flow in the hot isostatic pressing device according to one embodiment of the present invention.

Hereinafter, a hot isostatic pressing device (a HIP device) 100 according to one embodiment of the present invention will be described with reference to the drawings. The HIP device 100 performs isostatic pressing processing for a workpiece (W) by means of pressure-medium gas. FIG. 1 is a sectional view of the HIP device 100 along the vertical direction, the sectional view passing through a center line CL of the HIP device 100. FIG. 2 is a sectional view of a pressure-medium gas flow in the HIP device 100. FIGS. 3 to 7 are each horizontal sectional views of the HIP device 100 at positions A-A, B-B, C-C, D-D, and E-E.

The HIP device 100 includes a cylindrical high-pressure container 100S. The high-pressure container 100S includes an upper lid 1, a container trunk 2, and a lower lid 3. The container trunk 2 is formed in a cylindrical shape about the center axis CL along an upper-to-lower direction. The container trunk 2 includes a cylindrical inner peripheral surface 2S arranged about the center axis CL. The upper lid 1 closes an upper opening of the container trunk 2, and the lower lid 3 closes a lower opening of the container trunk 2. In the high-pressure container 100S, a body internal space 100T (a cavity) hermetically separated from the outside is formed. The inner peripheral surface 2S of the container trunk 2 defines the body internal space 100T. Not-shown supply and exhaust pipes are coupled to the high-pressure container 100S, and high-temperature high-pressure pressure-medium gas (argon gas or nitrogen gas pressure-increased to about 10 to 300 MPa so that HIP processing can be performed) can be supplied to or discharged from the high-pressure container 100S through these supply and exhaust pipes.

Further, the HIP device 100 includes an outer casing 4, an inner casing 5, a heat insulating body R, and a heater element 8 (a heating unit).

Figure 3:
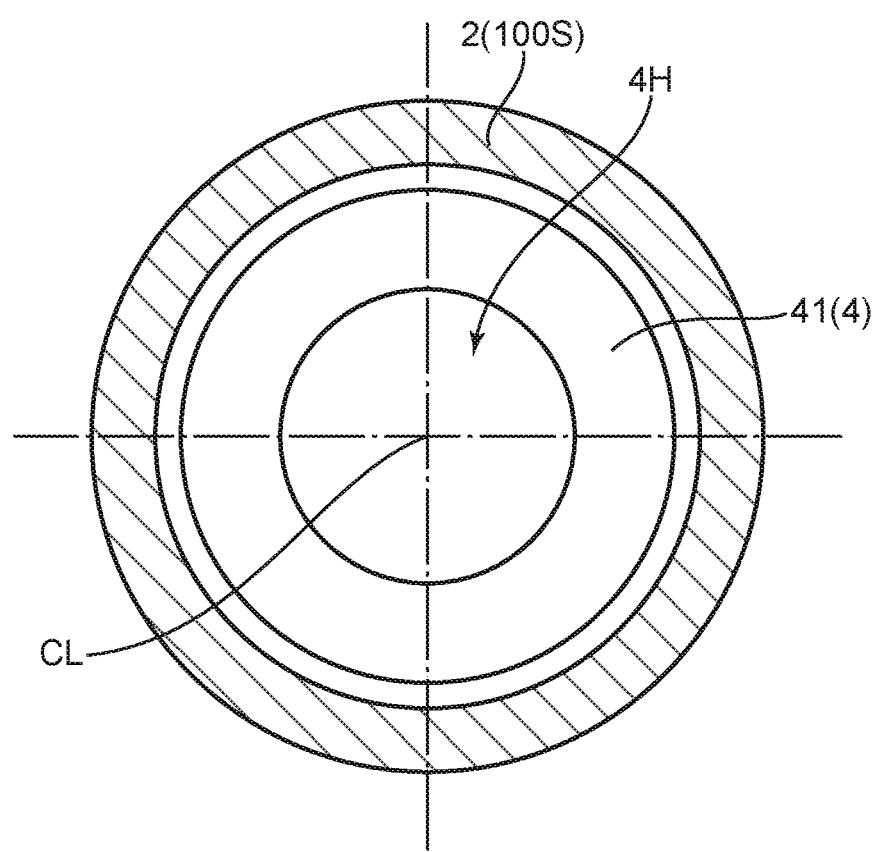
FIG. 3 is a sectional view of the hot isostatic pressing device of FIG. 2 at a position A-A.

The outer casing 4 is a covered cylindrical member arranged in the body internal space 100T of the high-pressure container 100S, and includes an inverted cup-shaped (a shape in which upper and lower sides of a cup are inverted) member opening downward. The outer casing 4 is arranged to surround the heat insulating body R. For the outer casing 4, a gas-impermeable heat-resistant material such as stainless steel, nickel alloy, molybdenum alloy, or graphite is used according to temperature conditions for the HIP processing. The outer casing 4 includes an outer upper wall portion 41 and an outer peripheral wall portion 42. The outer peripheral wall portion 42 is a cylindrical portion formed about the center axis CL in the body internal space 100T, and is arranged inside in a radial direction with a spacing from the inner peripheral surface 2S of the high-pressure container 100S. Moreover, the outer peripheral wall portion 42 extends along the upper-to-lower direction to surround a heat insulating body peripheral wall portion RS through a pressure-medium gas passage. The outer upper wall portion 41 is a discoid lid portion connected to an upper end portion of the outer upper wall portion 41 to close an upper portion of the outer peripheral wall portion 42. A circular outer opening 4H about the center axis CL opens at a center portion of the outer upper wall portion 41 (FIG. 3). The outer opening 4H allows permeation of the pressure-medium gas between the inside and the outside of the outer casing 4. Note that in the present embodiment, the outer upper wall portion 41 and the outer peripheral wall portion 42 are integrally formed.

Figure 4:
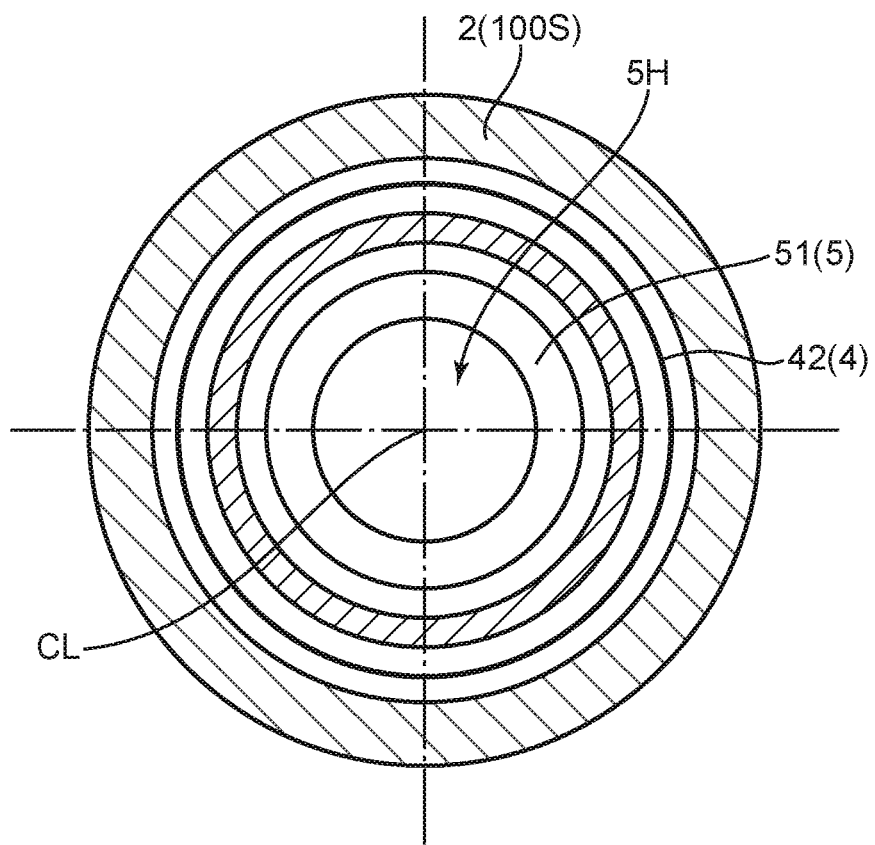
FIG. 4 is a sectional view of the hot isostatic pressing device of FIG. 2 at a position B-B.
Figure 5:
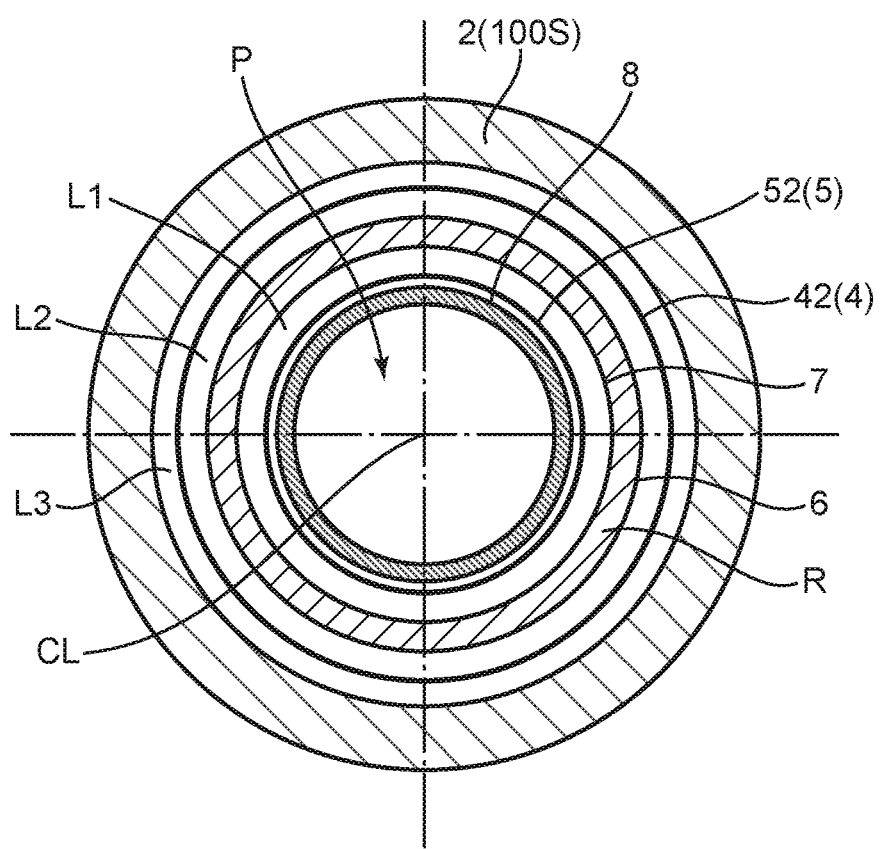
FIG. 5 is a sectional view of the hot isostatic pressing device of FIG. 2 at a position C-C.

The inner casing 5 is a covered cylindrical member arranged inside the outer casing 4 in the body internal space 100T of the high-pressure container 100S, and includes an inverted cup-shaped member opening downward. As in the outer casing 4, a gas-impermeable heat-resistant material is also used for the inner casing 5. The inner casing 5 includes an inner upper wall portion 51 and an inner peripheral wall portion 52. The inner peripheral wall portion 52 is a cylindrical portion formed about the center axis CL and extending along the upper-to-lower direction, and is arranged inside in the radial direction with a spacing from the outer peripheral wall portion 42 of the outer casing 4. The inner upper wall portion 51 is a discoid lid portion connected to an upper end portion of the inner peripheral wall portion 52 to close an upper portion of the inner peripheral wall portion 52. The inner upper wall portion 51 is arranged below the outer upper wall portion 41 with a spacing. A circular inner opening 5H about the center axis CL opens at a center portion of the inner upper wall portion 51 (an upper portion of the inner casing 5) (FIG. 4). The inner opening 5H allows permeation of the pressure-medium gas between a hot zone P and a space above the inner casing 5. Moreover, as illustrated in FIG. 1, the inner upper wall portion 51 and the inner peripheral wall portion 52 of the inner casing 5 are arranged to surround the hot zone P for pressing the workpiece. Note that the inner upper wall portion 51 and the inner peripheral wall portion 52 are integrally formed.

As illustrated in FIG. 1, the heat insulating body R is, between the outer casing 4 and the inner casing 5, arranged to surround the inner casing 5 in the body internal space 100T. The heat insulating body R includes an inverted cup-shaped structure opening downward. In the present embodiment, the heat insulating body R includes gas-impermeable characteristics. The heat insulating body R includes the heat insulating body peripheral wall portion RS and a heat insulating body upper wall portion RT. The heat insulating body peripheral wall portion RS is arranged between the outer peripheral wall portion 42 and the inner peripheral wall portion 52. The heat insulating body peripheral wall portion RS is a cylindrical portion arranged about the center axis CL with a spacing from each of the outer peripheral wall portion 42 and the inner peripheral wall portion 52. Moreover, the heat insulating body peripheral wall portion RS extends along the upper-to-lower direction to surround the inner peripheral wall portion 52 through the pressure-medium gas passage. The heat insulating body upper wall portion RT is a discoid lid portion connected to an upper end portion of the heat insulating body peripheral wall portion RS. The heat insulating body upper wall portion RT is connected to the heat insulating body peripheral wall portion RS to close an upper portion of the heat insulating body peripheral wall portion RS, and is arranged above the inner opening 5H through the pressure-medium gas passage. In other words, the heat insulating body upper wall portion RT is arranged below the outer upper wall portion 41 and above the inner upper wall portion 51. Note that no opening opens at the heat insulating body upper wall portion RT. Thus, the heat insulating body upper wall portion RT blocks, between the outer opening 4H and the inner opening 5H, a pressure-medium gas flow along the upper-to-lower direction.

Further, in the present embodiment, the heat insulating body R includes the following structure. As illustrated in FIG. 1, the heat insulating body R includes a heat insulating body outer cylinder 6 and a heat insulating body inner cylinder 7. Any of the heat insulating body outer cylinder 6 and the heat insulating body inner cylinder 7 includes an inverted cup-shaped member opening downward. A gas-impermeable heat-resistant material is used for the heat insulating body outer cylinder 6 and the heat insulating body inner cylinder 7. A clearance is formed in the radial direction between the heat insulating body outer cylinder 6 and the heat insulating body inner cylinder 7. Moreover, a clearance is also formed in the upper-to-lower direction between an upper portion of the heat insulating body outer cylinder 6 and an upper portion of the heat insulating body inner cylinder 7. Heat insulating gas may flow in these clearances to form a heat insulating layer. Note that the heat insulating layer may be filled with, e.g., a black lead material woven with carbon fibers or a porous or fiber material such as ceramic fibers. Alternatively, as in a later-described variation, the heat insulating body R may be in a form including three or more cylindrical bodies.

As illustrated in FIG. 1, a cylindrical space (an inter-casing inner flow path L1 (a passage)) in which the pressure-medium gas can flow is formed between the inner peripheral wall portion 52 of the inner casing 5 and the heat insulating body peripheral wall portion RS (the heat insulating body inner cylinder 7) of the heat insulating body R. An upper end portion of the inter-casing inner flow path L1 communicates with the hot zone P through the inner opening 5H. Moreover, a cylindrical space (an inter-casing outer flow path L2 (a passage)) in which the pressure-medium gas flows is formed between the outer peripheral wall portion 42 of the outer casing 4 and the heat insulating body peripheral wall portion RS (the heat insulating body outer cylinder 6) of the heat insulating body R. Further, a cylindrical space (an outer peripheral flow path L3 (a passage)) in which the pressure-medium gas flows is formed between the inner peripheral surface 2S of the high-pressure container 100S and the outer peripheral wall portion 42. An upper end portion of the outer peripheral flow path L3 communicates with the inter-casing outer flow path L2 through the outer opening 4H, and a lower end portion of the outer peripheral flow path L3 communicates with a later-described housing space 14B.

Regarding the HIP device 100 of FIG. 1, the HIP device 100 includes, in other words, the outer casing 4, the inner casing 5, the heat insulating body outer cylinder 6, and the heat insulating body inner cylinder 7 arranged in the body internal space 100T. That is, the HIP device 100 has a three-layer structure of four cup bodies.

The heater element 8 is arranged in the hot zone P, and generates heat to heat the pressure-medium gas in the hot zone P. The heater element 8 is controlled by a later-described control unit 90. In the present embodiment, the heater element 8 is divided into four upper and lower elements as illustrated in FIG. 1. These elements have a cylindrical shape, and are defined as a first heater element 81, a second heater element 82, a third heater element 83, and a fourth heater element 84 in this order from above (see FIG. 8).

Further, the HIP device 100 includes multiple communication pipes 11, multiple first gas conduits 12 (introduction pipes), multiple first on-off valves 13, a bottom wall portion 20, and a gas flow generation unit 30.

Figure 6:
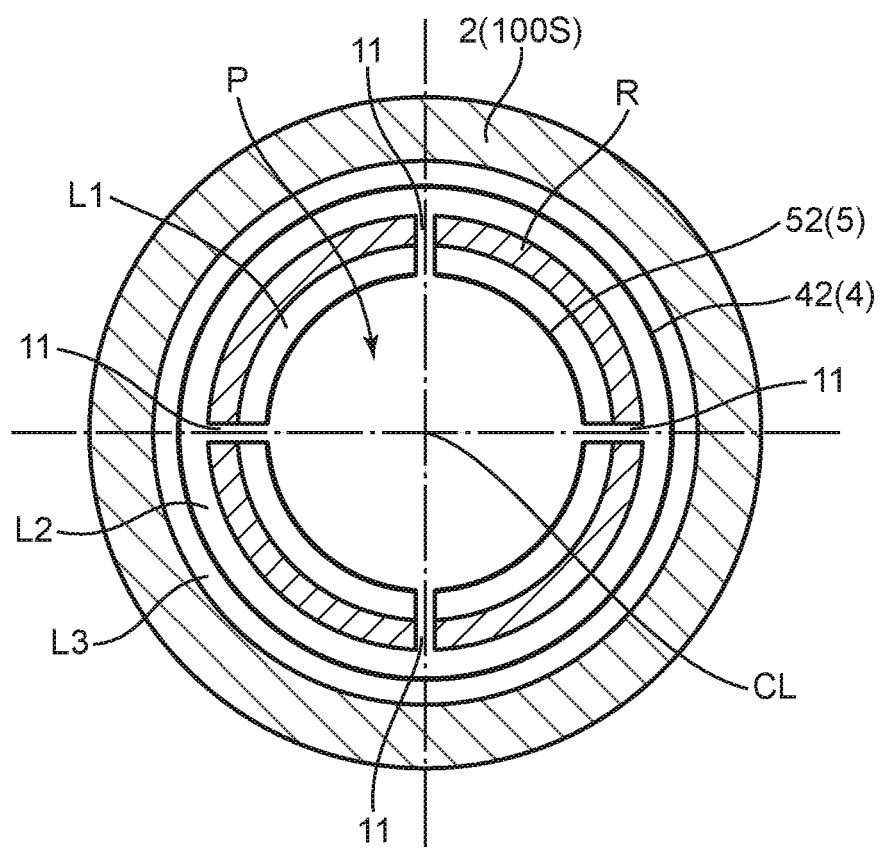
FIG. 6 is a sectional view of the hot isostatic pressing device of FIG. 2 at a position D-D.

The multiple communication pipes 11 are arranged at intervals along a circumferential direction about the center axis CL, and in the present embodiment, four communication pipes 11 are arranged as illustrated in FIG. 6. Each communication pipe 11 includes an inlet arranged at the inner peripheral wall portion 52 of the inner casing 5, and an outlet arranged at the heat insulating body peripheral wall portion RS (the heat insulating body outer cylinder 6) of the heat insulating body R. The multiple communication pipes 11 each allow a space (the inter-casing outer flow path L2) between the heat insulating body R (the heat insulating body outer cylinder 6) and the outer peripheral wall portion 42 and a lower end portion of the hot zone P to communicate with each other along the radial direction. Note that an inner pipe space passage) of each communication pipe 11 does not communicate with the inter-casing inner flow path L1 and the heat insulating layer of the heat insulating body R, and is blocked from these spaces. That is, each communication pipe 11 allows the lower end portion of the hot zone P and a lower end portion of the inter-casing outer flow path L2 to directly communicate with each other. Thus, openings through which the communication pipes 11 penetrate are formed at the inner casing 5, the heat insulating body outer cylinder 6, and the heat insulating body inner cylinder 7 (the heat insulating body peripheral wall portion RS), and a not-shown seal member is arranged between the opening and an outer peripheral surface of each communication pipe 11. The seal member prevents the pressure-medium gas in the hot zone P from directly flowing into the inter-casing inner flow path L1 or the heat insulating layer of the heat insulating body R from the periphery of the communication pipe 11.

The bottom wall portion 20 is a member configured to seal the hot zone P from below. Specifically, in the present embodiment, the bottom wall portion 20 is arranged to cover, from below, the entirety of a region inside in the radial direction with respect to a lower end portion of the outer peripheral wall portion 42 of the outer casing 4. The bottom wall portion 20 includes a bottom wall portion body 14 and a casing support portion 15 (a support portion). The casing support portion 15 integrally supports the lower end portion of the outer peripheral wall portion 42, a lower end portion of the inner peripheral wall portion 52, and a lower end portion of the heat insulating body peripheral wall portion RS. The casing support portion 15 has a ring shape as viewed from above. In the present embodiment, the lower end portion of the outer peripheral wall portion 42, the lower end portion of the inner peripheral wall portion 52, and the lower end portion of the heat insulating body peripheral wall portion RS are each joined to an upper portion of the casing support portion 15, and a seal member is arranged at each joint portion. The bottom wall portion body 14 supports the casing support portion 15 from below. As illustrated in FIG. 1, a region inside in the radial direction with respect to the bottom wall portion body 14 is arranged to protrude upward of a region outside in the radial direction. The bottom wall portion body 14 includes a mount portion 14A arranged at such an upwardly-protruding position. The mount portion 14A is arranged inside in the radial direction with respect to the casing support portion 15, and defines a lower portion of the hot zone P. Moreover, the mount portion 14A includes an upper portion on which the workpiece (W) is mounted. The workpiece (W) mounted on the upper portion of the mount portion 14A is arranged facing the hot zone P. Moreover, as illustrated in FIG. 1, the housing space 14B is formed below the mount portion 14A.

Note that a seal portion S (a packing member) is arranged between the bottom wall portion body 14 and the casing support portion 15. The seal portion S prevents the pressure-medium gas from flowing between the hot zone P and the body internal space 100T through between the bottom wall portion body 14 and the casing support portion 15. For enhancing scalability of the seal portion S, a not-shown spring member (a biasing member) may be arranged between the outer upper wall portion 41 of the outer casing 4 and the upper lid 1 of the high-pressure container 100S. In this case, the casing support portion 15 is pressed against the bottom wall portion body 14 by biasing force of the spring member, and the sealability of the seal portion S is improved. Note that in other embodiments, the bottom wall portion body 14 and the casing support portion 15 may be integrally formed. Moreover, not-shown holes through which an electric conductive wire of the heater element 8, a thermocouple conductive wire, etc. (any of these wires is a feedthrough) pass open at the bottom wall portion body 14. After the above-described feedthroughs have passed through the holes, each hole is also filled with a not-shown seal member.

The gas flow generation unit 30 is arranged in the housing space 14B below the bottom wall portion 20 in the body internal space 100T. The gas flow generation unit 30 includes a fan 9. The fan 9 rotates to generate the pressure-medium gas flow. The fan 9 is controlled by the later-described control unit 90.

Figure 7:
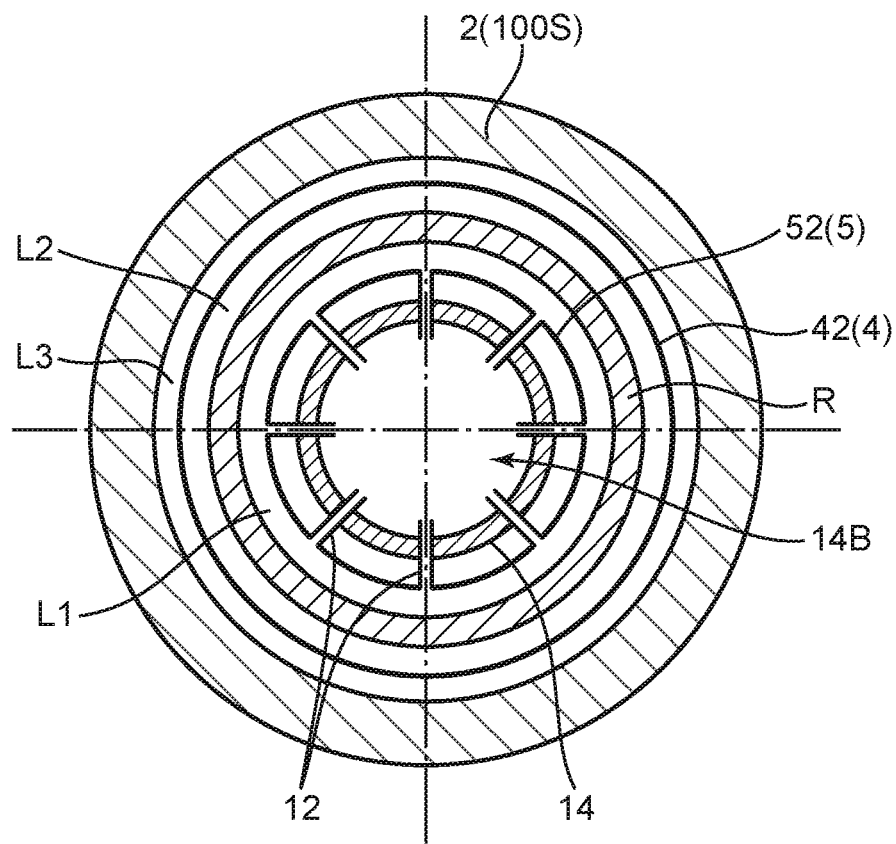
FIG. 7 is a sectional view of the hot isostatic pressing device of FIG. 2 at a position E-E.

The multiple first gas conduits 12 are arranged at intervals along the circumferential direction about the center axis CL, and in the present embodiment, eight first gas conduits 12 are arranged as illustrated in FIG. 7. Note that the number of multiple first gas conduits 12 is not limited to eight. Each first gas conduit 12 includes an inlet arranged at the housing space 14B, and an outlet arranged at the inner peripheral wall portion 52 of the inner casing 5. Each first gas conduit 12 allows a space (the inter-casing inner flow path L1) between a lower portion of the inner peripheral wall portion 52 and the heat insulating body peripheral wall portion RS and the gas flow generation unit 30 (the fan 9) to communicate with each other. Note that for uniformly distributing the pressure-medium gas having passed through the first gas conduit 12 to the inter-casing inner flow path L1, a not-shown gas splitter may be coupled to the first gas conduit 12.

Each of the multiple first on-off valves 13 is an electromagnetic valve arranged in the vicinity of the inlet of the first gas conduit 12. The first on-off valve 13 switches the pressure-medium gas flow at the first gas conduit 12 between a non-blocked state and a blocked state. Opening/closing of the first on-off valve 13 is controlled by the later-described control unit 90.

Figure 8:
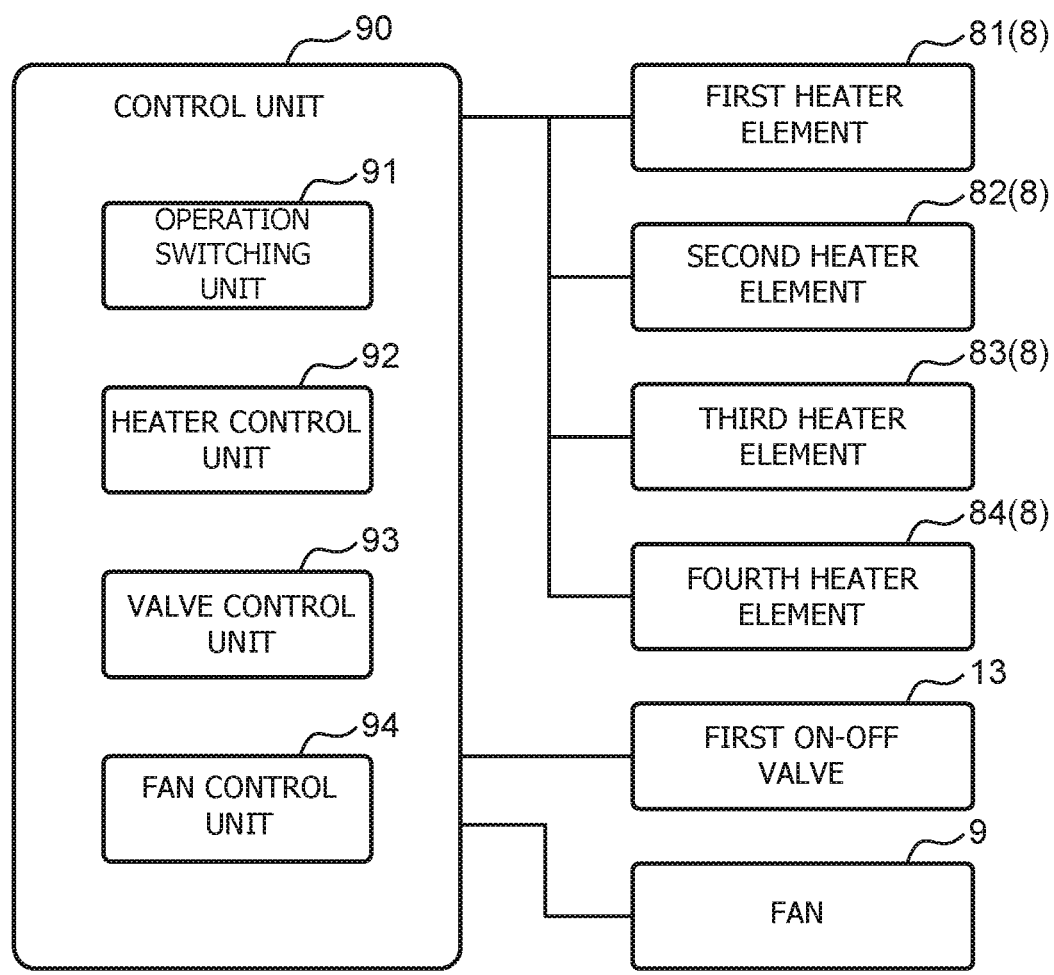
FIG. 8 is a block diagram of a control unit of the hot isostatic pressing device according to one embodiment of the present invention.

Further, the HIP device 100 includes the control unit 90. FIG. 8 is a block diagram of the control unit 90 of the HIP device 100 according to the present embodiment. The control unit 90 includes, for example, a central processing unit (CPU), a read only memory (ROM) configured to store a control program, and a random access memory (RAM) used as a working area of the CPU. Moreover, the heater element 8 (the first heater element 81, the second heater element 82, the third heater element 83, and the fourth heater element 84), the fan 9, and the first on-off valves 13 are electrically connected to the control unit 90. The control unit 90 functions as an operation switching unit 91, a heater control unit 92, a valve control unit 93, and a fan control unit 94 in such a manner that the CPU executes the control program stored in the ROM.

The operation switching unit 91 switches operation of the HIP device 100. The operation switching unit 91 switches the operation between pressing operation (pressing processing) and rapid cooling operation (rapid cooling processing). In the pressing processing, the operation switching unit 91 performs the isostatic pressing processing for the workpiece mounted on the mount portion 14A. In the rapid cooling processing, the operation switching unit 91 executes the rapid cooling processing for the hot zone P after the pressing processing for the workpiece has ended.

The heater control unit 92 switches an input voltage supply to the heater element 8 according to the operation controlled by the operation switching unit 91. As a result, the heater element 8 generates heat, or stop such heat generation. Moreover, the heater control unit 92 can adjust the amount of heat generation from the heater element 8.

As illustrated in FIG. 1, in the HIP device 100, the heater element 8 is divided into multiple upper and lower stages (four stages) (the first heater element 81 to the fourth heater element 84). Each heater element is temperature-measured by a not-shown thermocouple, and an input power amount is separately controlled (zone control). For example, when the heater control unit 92 increases power input to the heater element 8 of the lower stage, the pressure-medium gas heated at the lower stage ascends, and therefore, the heater control unit 92 decreases power input to the heater element 8 of the upper stage.

The valve control unit 93 switches opening operation of the multiple first on-off valves 13, thereby controlling the pressure-medium gas flow into the multiple first gas conduits 12.

The fan control unit 94 switches rotation operation of the fan 9, thereby controlling generation of the pressure-medium gas flow. In the present embodiment, the rotational frequency of the fan 9 is switchable by the fan control unit 94, and the flow rate of pressure-medium gas flowing into the first gas conduits 12 is adjustable.

Next, the pressure-medium gas flow in the HIP device 100 will be described with reference to FIGS. 1 to 8. When the hot isostatic pressing processing in the HIP device 100 is performed for the workpiece, the workpiece (W) is mounted on the mount portion 14A. At this point, in FIG. 1, the upper lid 1 is, for example, detached upwardly from the container trunk 2, and the casing support portion 15 is, together with the outer casing 4, the heat insulating body R, and the inner casing 5, detached upwardly from the bottom wall portion body 14. This allows mounting of the workpiece on the mount portion 14A. Thereafter, when each member is arranged again as in FIG. 1, the operation switching unit 91 (FIG. 8) of the control unit 90 starts the pressing processing to fill the body internal space 100T of the high-pressure container 100S with the pressure-medium gas from a not-shown supply path. Then, the heater control unit 92 of the control unit 90 controls the heater element 8 to start heating of the pressure-medium gas in the hot zone P.

Further, in the present embodiment, the fan control unit 94 rotates the fan 9 at low speed, and the valve control unit 93 opens the multiple first on-off valves 13. As a result, the fan 9 generates the pressure-medium gas flow. As illustrated in FIG. 2, the pressure-medium gas having flowed into the inter-casing inner flow path L1 (FIG. 1) between the inner peripheral wall portion 52 and the heat insulating body peripheral wall portion RS through the multiple first gas conduits 12 ascends along the inner peripheral wall portion 52 and the heat insulating body peripheral wall portion RS, and after having flowed into the hot zone P through the inner opening 5H, descends in the hot zone P. Further, the pressure-medium gas flows into the inter-casing outer flow path L2 (FIG. 1) between the outer peripheral wall portion 42 and the heat insulating body peripheral wall portion RS through the multiple communication pipes 11.

Further, as illustrated in FIG. 2, the pressure-medium gas having flowed into the inter-casing outer flow path L2 through the multiple communication pipes 11 ascends along the heat insulating body peripheral wall portion RS and the outer peripheral wall portion 42, and thereafter, flows out of the outer casing 4 through the outer opening 4H. Further, the pressure-medium gas descends through the outer peripheral flow path L3 (FIG. 1) between the inner peripheral surface 2S of the high-pressure container 100S and the outer peripheral wall portion 42, and below the bottom wall portion 20, flows again into the multiple first gas conduits 12 by the fan 9. As a result, a gentle pressure-medium gas circulation flow is formed between the body internal space 100T of the high-pressure container 100S and the hot zone P.

As described above, in the present embodiment, a low-temperature pressure-medium gas flow generated by the fan 9 flows into the hot zone P through the inner opening 5H in the pressing processing for the workpiece. The pressure-medium gas having a lower temperature than that of the pressure-medium gas in the hot zone P gradually descends in the hot zone P. Thus, even when the low-temperature pressure-medium gas directly flows (leaks) into the hot zone P from the periphery (a seal portion) of the bottom wall portion 20 sealing the lower portion of the hot zone P, thermal uniformity in the hot zone P during the pressing processing is held. Moreover, the pressure-medium gas having flowed into the hot zone P through the inner opening 5H flows into the inter-casing outer flow path L2 from the lower portion of the hot zone P through the multiple communication pipes 11. Thus, the pressure-medium gas flow does not become stagnant in the hot zone P, and the thermal uniformity in the hot zone P is further held. Moreover, the pressure-medium gas having flowed into the inter-casing outer flow path L2 ascends, and thereafter, flows out to the outer peripheral flow path L3 through the outer opening 4H. Thus, the thermal uniformity in the hot zone P can be maintained. Moreover, a local decrease in the temperatures of lower portions of the heat insulating body R and the outer casing 4 can be suppressed while a pressure-medium gas circulation flow can be stably formed in the body internal space 100T.

Note that in the present embodiment, the pressure-gas flow generated by the fan 9 and having flowed through the multiple first gas conduits 12 ascends through the inter-easing inner flow path L1. The inter-casing inner flow path L1 is the cylindrical space formed between the inner peripheral wall portion 52 of the inner casing 5 and the heat insulating body peripheral wall portion RS of the heat insulating body R, and the sectional area of the inter-casing inner flow path L1 is larger than that of the multiple first gas conduits 12. Thus, the flow rate of pressure-medium gas having flowed into the inter-casing inner flow path L1 decreases, and the pressure-medium gas uniformly flows into the hot zone P across the entirety in the circumferential direction at a gentle speed. Thus, the thermal uniformity in the hot zone P can be stably improved without interference with the pressing processing for the workpiece in the hot zone P. Moreover, since the flow rate of pressure-medium gas decreases as described above, the flow rate of pressure-medium gas flowing into the hot zone P through the inner opening 5H can be closer to the flow rate of pressure-medium gas flowing (leaking) into the hot zone P from the periphery of the bottom wall portion 20.

Note that in the present embodiment, the inner opening 5H opens at the inner casing 5 to allow the pressure-medium gas flow along the upper-to-lower direction in the hot zone P. However, as illustrated in FIG. 1, the heat insulating body R is arranged to surround the outside of the inner casing 5, and no opening is formed at the heat insulating body upper wall portion RT of the heat insulating body R. Thus, heat insulating performance for holding the temperature of the hot zone P is maintained equally to other HIP devices including no openings at casings.

Further, in the present embodiment, when the pressing processing for the workpiece ends, the operation switching unit 91 switches the operation of the HIP device 100 from the pressing operation to the rapid cooling operation. As a result, the heater control unit 92 stops heat generation of the heater element 8. Meanwhile, the valve control unit 93 continuously keeps the first on-off valves 13 open, and the fan control unit 94 keeps the fan 9 rotated. That is, the fan 9 continuously forms the pressure-medium gas circulation flow between the body internal space 100T and the hot zone P, and accordingly, the rapid cooling processing in the hot zone P is executed.

With this configuration, a pressure-medium gas flow path for holding the thermal uniformity is utilized so that rapid cooling of the HIP device 100 after the pressing processing can be executed. As a result, workpiece pressing processing time including time until removal of the workpiece can be shortened.

Note that the fan 9 controlled by the fan control unit 94 of the control unit 90 may generate the pressure-medium gas flow such that the flow rate of pressure-medium gas passing through the first gas conduits 12 upon execution of the rapid cooling processing is greater than the flow rate of pressure-medium gas passing through the first gas conduits 12 upon the pressing processing. In this case, rapid cooling of the HIP device 100 after the pressing processing can be executed within a shorter period of time.

Note that as an additional remark regarding the structure of the HIP device 100 according to the present embodiment, no opening opens at an upper portion of each cup body (each casing) in a typical hot isostatic pressing device (a typical HIP device) having no rapid cooling function. In this case, it is not necessary to arrange the bottom wall portion 20 as in FIG. 1. In such a technique, cooling is performed by natural heat radiation after the pressing processing for the workpiece has ended. Thus, no opening is necessary as described above. Moreover, during the pressing processing, a hot zone formed by the inverted cup body is heated as in a hot-air balloon. At this point, no pressure-medium gas flows out of the upper portion of the inverted cup body, and therefore, less new pressure-medium gas flows in through a lower portion of the inverted cup body. Thus, the bottom wall portion 20 is not necessary as described above. On the other hand, in a case where the inner opening 5H opens, as in the present embodiment, at the inner casing 5 to allow the pressure-medium gas in the hot zone P to actively flow after the pressing processing, there is a probability that the pressure-medium gas in the hot zone P flows out through the inner opening 5H during the pressing processing. In this case, the low-temperature pressure-medium gas easily flows, as described above, into the hot zone P from each seal portion at the periphery of the bottom wall portion 20. As a result, the lower side of the hot zone P tends to have a lower temperature than that of the upper side, and the thermal uniformity in the hot zone P is degraded. Note that even in a case where the bottom wall portion 20 includes an integrated member, there is a probability that the pressure-medium gas flows in through the joint portion between the casing support portion 15 of the bottom wall portion 20 and each casing member (the outer casing 4, the inner casing 5, the heat insulating body R).

In the typical HIP device, in a case where low-temperature pressure-medium gas flows into the hot zone P from the periphery of the bottom wall portion 20, the heater control unit 92 of the control unit 90 (FIG. 8) virtually studies execution of the above-described zone control for the heater element 8. In this case, the temperature of the lower portion of the hot zone P partially decreases, and therefore, the heater control unit 92 increases the power input to the lower heater element 8. On the other hand, the heater control unit 92 does not necessarily increase power to the upper heater element 8. However, the pressure-medium gas heated by the lower heater element 8 ascends. Thus, the heater control unit 92 rather decreases the power input to the upper heater element 8. Eventually, the power input to the upper heater element 8 reaches substantially zero, and the temperature of the entirety of the hot zone P is controlled only by the lower heater element 8. As a result, the zone control for the hot zone P becomes difficult.

The present invention is, in response to the above-described problems, characterized in that the low-temperature pressure-medium gas flows into the hot zone P little by little through the inner opening 5H. The inflow low-temperature pressure-medium gas descends in the high-temperature pressure-medium gas in the hot zone P. Thus, even in a case where the low-temperature pressure-medium gas flows (leaks) in through the seal portion at the periphery of the bottom wall portion 20, the thermal uniformity in the hot zone P is held.

The hot isostatic pressing device (HIP device) 100 according to one embodiment of the present invention has been described above, but the present invention is not limited to these forms. The following variations may be employed as the hot isostatic pressing device according to the present invention.

(1) The above-described embodiment has described such a form that the gas flow generation unit 30 configured to generate the pressure-medium gas flow includes the fan 9, but the gas flow generation unit 30 may include a well-known injector to generate the pressure-medium gas flow.

Figure 9:
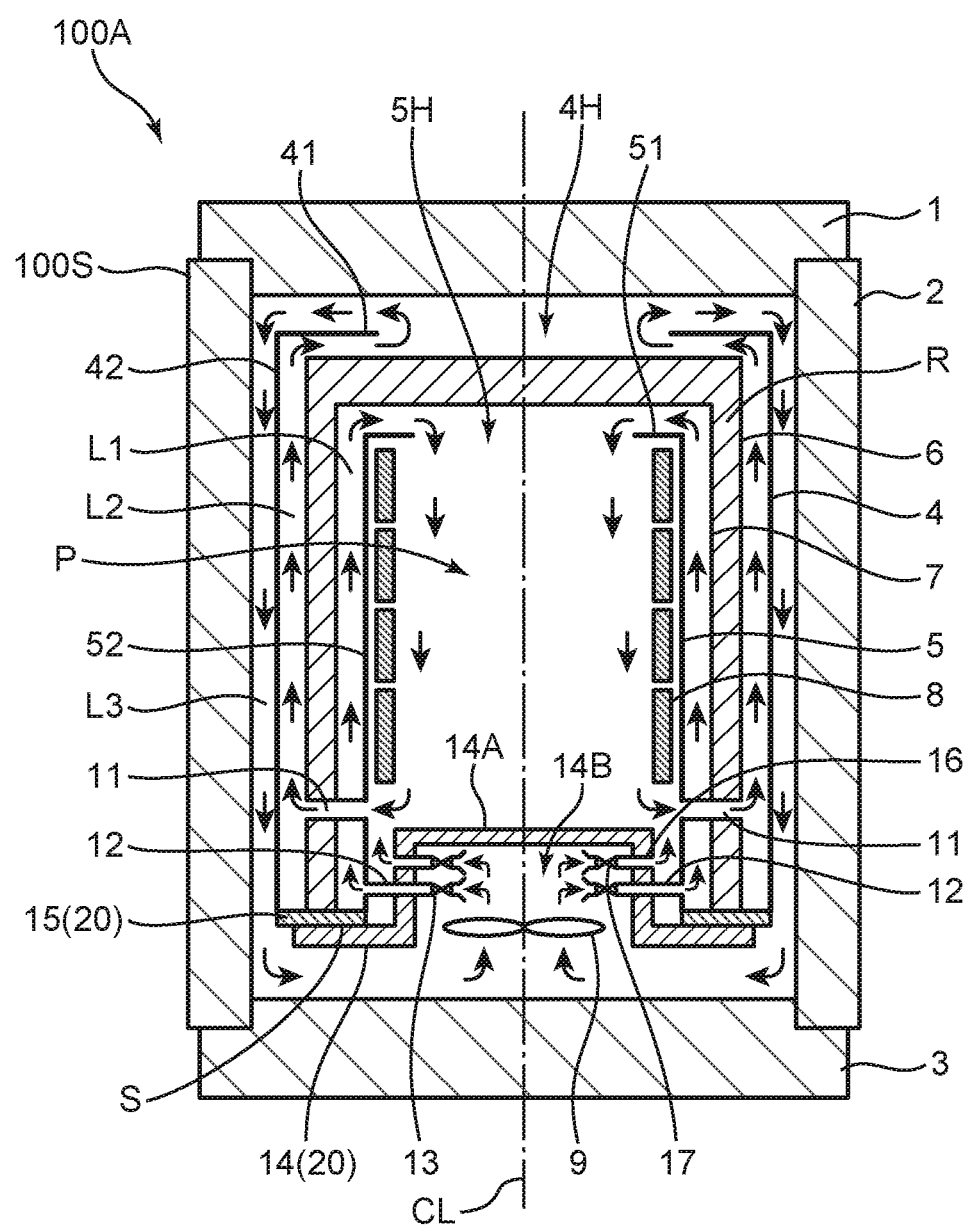
FIG. 9 is a sectional view of a hot isostatic pressing device according to a first variation of the present invention.

(2) The above-described embodiment has described such a form that only the pressure-medium gas having descended in the hot zone P flows into the inter-casing outer flow path L2 through the multiple communication pipes 11, but the present invention is not limited to such a form. FIG. 9 is a sectional view of a hot isostatic pressing device 100A according to a first variation of the present invention. In the present variation, the HIP device 100A is different from the previous embodiment in that multiple second gas conduits 16 (junction pipes) and multiple second on-off valves 17 are further provided. Thus, such a difference will be described, and description of other common points will be omitted.

The multiple second gas conduits 16 are arranged at the bottom wall portion body 14. Note that the multiple second gas conduits 16 are each arranged above the multiple first gas conduits 12 of FIG. 7. The multiple second gas conduits 16 allow the housing space 14B and the lower end portion of the hot zone P to communicate with each other. As a result, as illustrated in FIG. 9, the fan 9 and the inlets of the multiple communication pipes 11 communicate with each other through the multiple second gas conduits 16. The multiple second on-off valves 17 are each arranged in the vicinity of inlets of the multiple second gas conduits 16. Each second on-off valve 17 switches the pressure-medium gas flow at the second gas conduit 16 between the non-blocked state and the blocked state. Note that opening/closing operation of the second on-off valves 17 is controlled by the valve control unit 93 of the control unit 90 described above.

In the present variation, the control unit 90 opens, in the rapid cooling processing, not only the multiple first on-off valves 13 but also the multiple second on-off valves 17. As a result, the multiple second gas conduits 16 allow the pressure-medium gas generated by the fan 9 to join, at an inlet side of the communication pipes 11, the pressure-medium gas having descended in the hot zone P after having passed through the multiple first gas conduits 12 in advance. As a result, in the rapid cooling processing, the high-temperature pressure-medium gas flowing out of the hot zone P can be mixed with the low-temperature pressure-medium gas. Thus, in the rapid cooling processing, the temperature of the pressure-medium gas flow exchanging heat with the inner peripheral surface 2S (FIG. 1) of the high-pressure container 100S can be decreased, and the flow rate of such a pressure-medium gas flow can be increased. As a result, a heat exchange efficiency in a case where the temperature of the high-pressure container 100S is maintained at equal to or lower than an acceptable temperature in terms of strength is high, and therefore, the rapid cooling speed of the HIP device 100A can be improved. Note that the multiple second gas conduits 16 may cause the multiple communication pipes 11 and the gas flow generation unit 30 (the fan 9) to communicate with each other through at least one of the space between the heat insulating body peripheral wall portion RS and the outer peripheral wall portion 42 or the lower end portion of the hot zone P.

Figure 10:
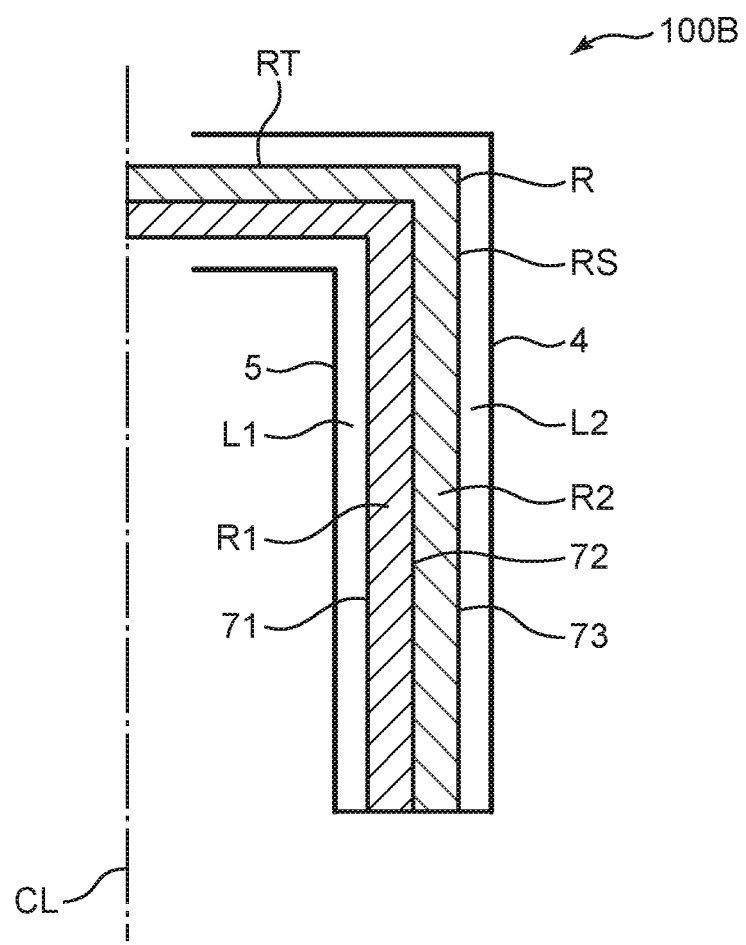
FIG. 10 is an enlarged sectional view of a hot isostatic pressing device according to a second variation of the present invention.

(3) The above-described embodiment has described such a form that the heat insulating body outer cylinder 6 and the heat insulating body inner cylinder 7 arranged with a spacing from each other form the heat insulating body R, but the present invention is not limited to such a form. FIG. 10 is an enlarged sectional view of a hot isostatic pressing device 100B according to a second variation of the present invention, and FIG. 11 is an enlarged sectional view of a hot isostatic pressing device 100C according to a third variation of the present invention.

In the HIP device 100B of FIG. 10, the heat insulating body R includes a first heat insulating casing 71, a second heat insulating casing 72, and a third heat insulating casing 73, these heat insulating casings having an inverted cup shape. A first heat insulating layer R1 is formed between the first heat insulating casing 71 and the second heat insulating casing 72, and a second heat insulating layer R2 is formed between the second heat insulating casing 72 and the third heat insulating casing 73. Moreover, as in the previous embodiment, the inter-casing inner flow path L1 is formed between the inner casing 5 and the first heat insulating casing 71, and the inter-casing outer flow path L2 is formed between the third heat insulating casing 73 and the outer casing 4. That is, in the present variation, the HIP device 100 has a four-layer structure of five cup bodies. Note that a narrower interval between the cup bodies results in less gas convection and a higher heat insulating effect. Moreover, in FIG. 10, the inter-casing inner flow path L1 and the inter-casing outer flow path L2 are gas layers in which the pressure-medium gas flows, and the first heat insulating layer R1 and the second heat insulating layer R2 are filled with a heat insulating material. In other variations, the first heat insulating layer R1 and the second heat insulating layer R2 may be also gas layers.

Figure 11:
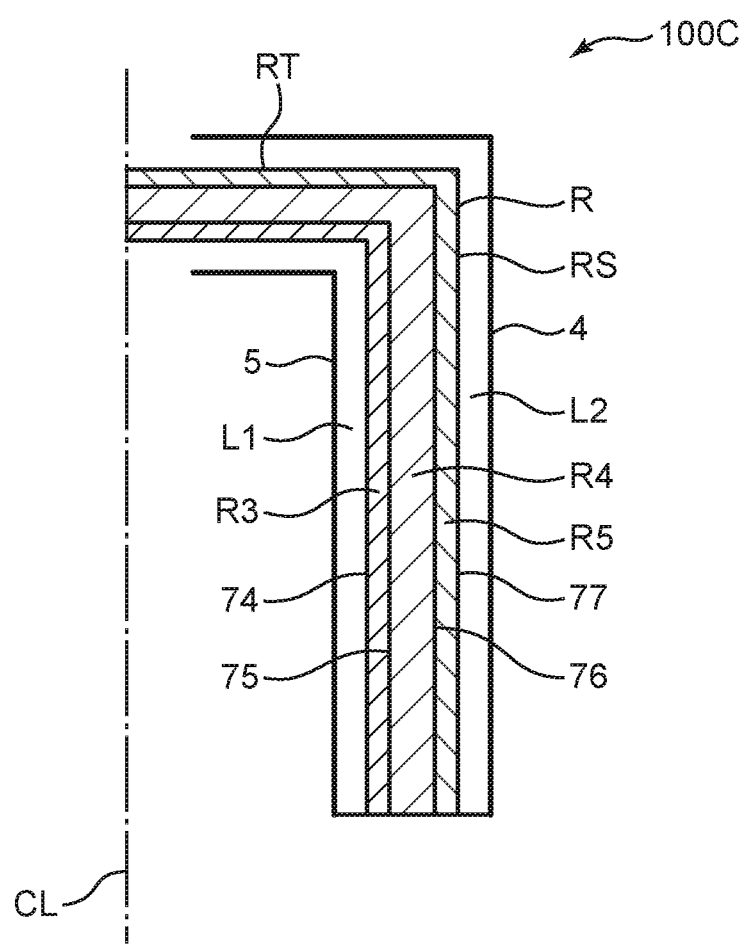
FIG. 11 is an enlarged sectional view of a hot isostatic pressing device according to a third variation of the present invention.

Similarly, in the HIP device 100C of FIG. 11, the heat insulating body R includes a fourth heat insulating casing 74, a fifth heat insulating casing 75, a sixth heat insulating casing 76, and a seventh heat insulating casing 77, these heat insulating casings having an inverted cup shape. A third heat insulating layer R3 is formed between the fourth heat insulating casing 74 and the fifth heat insulating casing 75, a fourth heat insulating layer R4 is formed between the fifth heat insulating casing 75 and the sixth heat insulating casing 76, and a fifth heat insulating layer R5 is formed between the sixth heat insulating casing 76 and the seventh heat insulating casing 77. Moreover, as in the previous embodiment, the inter-casing inner flow path L1 is formed between the inner casing 5 and the fourth heat insulating casing 74, and the inter-casing outer flow path L2 is formed between the seventh heat insulating casing 77 and the outer casing 4. That is, in the present variation, the HIP device 100 has a five-layer structure of six cup bodies. Note that the structure of each layer is similar to that of 100B of FIG. 10.

(4) Moreover, the above-described embodiment has described such a form that the outer casing 4 includes the outer upper wall portion 41 and the inner casing 5 includes the inner upper wall portion 51, but the present invention is not limited to such a form. The outer casing 4 may include only the outer peripheral wall portion 42, and an upper end portion of the outer peripheral wall portion 42 may open to form the outer opening 411 at the outer casing 4, Alternatively, the inner casing 5 may include only the inner peripheral wall portion 52, and the upper end portion of the inner peripheral wall portion 52 may open to form the inner opening 5H at the inner casing 5.

(5) Further, the above-described embodiment has described such a form that the inner casing 5, the heat insulating body R, and the outer casing 4 each have the cylindrical shape about the center CL, but the shape of each member is not limited to the cylindrical shape.

(6) In addition, the above-described embodiment has described such a form that the heater element 8 generates heat during the pressing processing, but heat generation from the heater element 8 may be stopped during part of the pressing processing. In this case, the pressure-medium gas circulation flow may be continuously formed by the gas flow generation unit 30, or formation of the circulation flow may be stopped temporarily.

Provided is, according to the present invention, a hot isostatic pressing device for performing isostatic pressing processing for a workpiece by means of pressure-medium gas. The hot isostatic pressing device includes a high-pressure container including an inner peripheral surface extending along an upper-to-lower direction, a body internal space defined by the inner peripheral surface being formed inside the high-pressure container; an inner casing arranged in the body internal space and including a gas-impermeable inner peripheral wall portion extending along the upper-to-lower direction to surround a hot zone for pressing the workpiece, an inner opening allowing permeation of the pressure-medium gas opening at an upper portion of the inner casing; a gas-impermeable heat insulating body arranged to surround the inner casing in, the body internal space, the heat insulating body having a heat insulating body peripheral wall portion extending along the upper-to-lower direction to surround the inner peripheral wall portion through a pressure-medium gas passage and a heat insulating body upper wall portion connected to the heat insulating body peripheral wall portion to close an upper portion of the heat insulating body peripheral wall portion and arranged above the inner opening through the pressure-medium gas passage; an outer casing arranged to surround the heat insulating body in the body internal space, the outer casing including a gas-impermeable outer peripheral wall portion extending along the upper-to-lower direction to surround the heat insulating body peripheral wall portion through the pressure-medium gas passage and an outer opening allowing permeation of the pressure-medium gas opening at an upper portion of the outer casing; a heating unit arranged in the hot zone to generate heat; a bottom wall portion including a support portion supporting a lower end portion of the outer peripheral wall portion, a lower end portion of the inner peripheral wall portion, and a lower end portion of the heat insulating body peripheral wall portion and a mount portion defining a lower portion of the hot zone and having an upper portion allowing mounting of the workpiece and sealing the hot zone from below; multiple communication pipes blocked from a space between the inner peripheral wall portion and the heat insulating body peripheral wall portion and each forming the pressure-medium gas passage penetrating the heat insulating body peripheral wall portion to allow a space between the heat insulating body peripheral wall portion and the outer peripheral wall portion and a lower end portion of the hot zone to communicate with each other; multiple introduction pipes allowing a lower portion of the space between the inner peripheral wall portion and the heat insulating body peripheral wall portion and a portion of the body internal space below the bottom wall portion to communicate with each other; and a gas flow generation unit arranged below the bottom wall portion in the body internal space and configured to generate a pressure-medium gas flow flowing into the multiple introduction pipes upon pressing processing for performing the isostatic pressing processing for the workpiece mounted on the mount portion.

According to the present configuration, the low-temperature pressure-medium gas flow generated by the gas flow generation unit flows into the hot zone through the inner opening upon the pressing processing for the workpiece. The pressure-medium gas having a lower temperature than that of the pressure-medium gas in the hot zone gradually descends in the hot zone. Thus, even when the low-temperature pressure-medium gas directly flows (leaks) into the hot zone from the periphery of the bottom wall portion sealing the lower portion of the hot zone, thermal uniformity in the hot zone during the pressing processing is held. Moreover, the pressure-medium gas having flowed into the hot zone through the inner opening flows into the space between the outer peripheral wall portion and the heat insulating body peripheral wall portion from the lower portion of the hot zone through the multiple communication pipes. Thus, the pressure-medium gas flow does not become stagnant in the hot zone, and the thermal uniformity iii the hot zone is further held. Further, the inner opening opens at the inner casing such that the pressure-medium gas flow along the upper-to-lower direction is allowed in the hot zone. However, according to the above-described configuration, the heat insulating body is arranged to surround the outside of the inner casing. Thus, heat insulating performance for holding the temperature of the hot zone is maintained equally to other hot isostatic pressing devices including no openings at casings.

In the above-described configuration, the gas flow generation unit preferably generates the pressure-medium gas flow such that after the pressure-medium gas flow having flowed into the space between the inner peripheral wall portion and the heat insulating body peripheral wall portion through the multiple introduction pipes has ascended along the inner peripheral wall portion and the heat insulating body peripheral wall portion and has flowed into the hot zone through the inner opening, the pressure-medium gas flow descends in the hot zone and further flows into the space between the outer peripheral wall portion and the heat insulating body peripheral wall portion through the multiple communication pipes.

According to the present configuration, the low-temperature pressure-medium gas flow descending in the hot zone can be stably formed.

In the above-described configuration, the inner casing preferably further includes an inner upper wall portion connected to the inner peripheral wall portion to close an upper portion of the inner peripheral wall portion, and the inner opening preferably opens at the inner upper wall portion. The outer casing preferably further includes an outer upper wall portion connected to the outer peripheral wall portion to close an upper portion of the outer peripheral wall portion, and the outer opening preferably opens at the outer upper wall portion.

According to this configuration, the low-temperature pressure-medium gas can flow into the hot zone through the inner opening formed at the inner upper wall portion. Moreover, the pressure-medium gas can flow out of the outer casing through the outer opening formed at the outer upper wall portion.

In the above-described configuration, the gas flow generation unit preferably forms, upon the pressing processing, a pressure-medium gas circulation flow in the body internal space such that after the pressure-medium gas having flowed into the space between the outer peripheral wall portion and the heat insulating body peripheral wall portion through the multiple communication pipes has ascended along the heat insulating body peripheral wall portion and the outer peripheral wall portion, the pressure-medium gas flows out of the outer casing through the outer opening, further descends through between the inner peripheral surface of the high-pressure container and the outer peripheral wall portion, and flows again into the multiple introduction pipes.

According to this configuration, the thermal uniformity in the hot zone can be maintained while the pressure-medium gas circulation flow can be stably formed in the body internal space.

In the above-described configuration, the gas flow generation unit preferably forms the pressure-medium gas circulation flow in the body internal space after the pressing processing for the workpiece has ended, thereby executing rapid cooling processing for the hot zone.

According to this configuration, a pressure-medium gas flow path for holding the thermal uniformity is utilized so that rapid cooling of the hot isostatic pressing device after the pressing processing can be executed. As a result, workpiece pressing processing time including time until removal of the workpiece can be shortened.

In the above-described configuration, the gas flow generation unit preferably generates the pressure-medium gas flow such that the flow rate of the pressure-medium gas passing through the introduction pipes upon execution of the rapid cooling processing is greater than the flow rate of the pressure-medium gas passing through the introduction pipes upon the pressing processing.

According to this configuration, rapid cooling of the hot isostatic pressing device after the pressing processing can be executed within a shorter period of time.

In the above-described configuration, the hot isostatic pressing device preferably further includes multiple junction pipes allowing the multiple communication pipes and the gas flow generation unit to communicate with each other through at least one of the space between the heat insulating body peripheral wall portion and the outer peripheral wall portion and the lower end portion of the hot zone, the junction pipes allowing, upon the rapid cooling processing, the pressure-medium gas flow generated by the gas flow generation unit to join the pressure-medium gas having descended in the hot zone after the pressure-medium gas has passed through the introduction pipes in advance.

According to this configuration, the low-temperature pressure-medium gas can be, upon the rapid cooling processing, mixed with the high-temperature pressure-medium gas flowing out of the hot zone. Thus, upon the rapid cooling processing, the temperature of the pressure-medium gas flow exchanging heat with the inner peripheral surface of the high-pressure container can be decreased, and the flow rate of such a pressure-medium gas flow can be increased. As a result, the rapid cooling speed of the hot isostatic pressing device can be improved.

The invention claimed is:

1. A hot isostatic pressing device for performing isostatic pressing processing for a workpiece by means of pressure-medium gas, comprising:
    a high-pressure container including an inner peripheral surface extending along an upper-to-lower direction, a body internal space defined by the inner peripheral surface being formed inside the high-pressure container;
    an inner casing arranged in the body internal space and including a gas-impermeable inner peripheral wall portion extending along the upper-to-lower direction to surround a hot zone for pressing the workpiece, an inner opening allowing permeation of the pressure-medium gas opening at an upper portion of the inner casing;
    a gas-impermeable heat insulating body arranged to surround the inner casing in the body internal space, the heat insulating body having a heat insulating body peripheral wall portion extending along the upper-tolower direction to surround the inner peripheral wall portion and a heat insulating body upper wall portion connected to the heat insulating body peripheral wall portion to close an upper portion of the heat insulating body peripheral wall portion and arranged above the inner opening, a pressure-medium gas passage being formed between the heat insulating body peripheral wall portion and the inner peripheral wall portion;

an outer casing arranged to surround the heat insulating body in the body internal space, the outer casing including a gas-impermeable outer peripheral wall portion extending along the upper-to-lower direction to surround the heat insulating body peripheral wall portion and an outer opening allowing permeation of the pressure-medium gas opening at an upper portion of the outer casing, a pressure-medium gas passage being formed between the heat insulating body peripheral wall portion and the gas-impermeable outer peripheral wall portion;

a heating unit arranged in the hot zone to generate heat;

a bottom wall portion including a support portion supporting a lower end portion of the outer peripheral wall portion, a lower end portion of the inner peripheral wall portion, and a lower end portion of the heat insulating body peripheral wall portion and a mount portion defining a lower portion of the hot zone and having an upper portion allowing mounting of the workpiece and sealing of the hot zone from below;

multiple communication pipes blocked from a space between the inner peripheral wall portion and the heat insulating body peripheral wall portion and each forming a pressure-medium gas passage penetrating the heat insulating body peripheral wall portion to allow a space between the heat insulating body peripheral wall portion and the outer peripheral wall portion and a lower end portion of the hot zone to communicate with each other;

multiple introduction pipes allowing a lower portion of the space between the inner peripheral wall portion and the heat insulating body peripheral wall portion and a portion of the body internal space below the bottom wall portion to communicate with each other; and a gas flow generator arranged below the bottom wall portion in the body internal space and configured to generate a pressure-medium gas flow flowing into the multiple introduction pipes upon pressing processing for performing the isostatic pressing processing for the workpiece mounted on the mount portion.

2. The hot isostatic pressing device according to claim 1, wherein
the gas flow generator generates the pressure-medium gas flow such that after the pressure-medium gas flow having flowed into the space between the inner peripheral wall portion and the heat insulating body peripheral wall portion through the multiple introduction pipes has ascended along the inner peripheral wall portion and the heat insulating body peripheral wall portion and has flowed into the hot zone through the inner opening, the pressure-medium gas flow descends in the hot zone and further flows into the space between the outer peripheral wall portion and the heat insulating body peripheral wall portion through the multiple communication pipes.

3. The hot isostatic pressing device according to claim 1, wherein
the inner casing further includes an inner upper wall portion connected to the inner peripheral wall portion to close an upper portion of the inner peripheral wall portion, and the inner opening opens at the inner upper wall portion, and
the outer casing further includes an outer upper wall portion connected to the outer peripheral wall portion to close an upper portion of the outer peripheral wall portion, and the outer opening opens at the outer upper wall portion.

4. The hot isostatic pressing device according to claim 1, wherein
the gas flow generator forms, upon the pressing processing, a pressure-medium gas circulation flow in the body internal space such that after the pressure-medium gas having flowed into the space between the outer peripheral wall portion and the heat insulating body peripheral wall portion through the multiple communication pipes has ascended along the heat insulating body peripheral wall portion and the outer peripheral wall portion, the pressure-medium gas flows out of the outer casing through the outer opening, further descends through between the inner peripheral surface of the high-pressure container and the outer peripheral wall portion, and flows again into the multiple introduction pipes.

5. The hot isostatic pressing device according to claim 4, wherein
the gas flow generator forms the pressure-medium gas circulation flow in the body internal space after the pressing processing for the workpiece has ended, thereby executing rapid cooling processing for the hot zone.

6. The hot isostatic pressing device according to claim 5, wherein
the gas flow generator generates the pressure-medium gas flow such that a flow rate of the pressure-medium gas passing through the introduction pipes upon execution of the rapid cooling processing is greater than a flow rate of the pressure-medium gas passing through the introduction pipes upon the pressing processing.

7. The hot isostatic pressing device according to claim 5, further comprising:
multiple junction pipes allowing the multiple communication pipes and the gas flow generator to communicate with each other through at least one of the space between the heat insulating body peripheral wall portion and the outer peripheral wall portion and the lower end portion of the hot zone, the junction pipes allowing, upon the rapid cooling processing, the pressure-medium gas flow generated by the gas flow generator to join the pressure-medium gas having descended in the hot zone after the pressure-medium gas has passed through the introduction pipes in advance.

8. The hot isostatic pressing device according to claim 2, wherein
the inner casing further includes an inner upper wall portion connected to the inner peripheral wall portion to close an upper portion of the inner peripheral wall portion, and the inner opening opens at the inner upper wall portion, and
the outer casing further includes an outer upper wall portion connected to the outer peripheral wall portion to close an upper portion of the outer peripheral wall portion, and the outer opening opens at the outer upper wall portion.

9. The hot isostatic pressing device according to claim 2, wherein
- the gas flow generator forms, upon the pressing processing, a pressure-medium gas circulation flow in the body internal space such that after the pressure-medium gas having flowed into the space between the outer peripheral wall portion and the heat insulating body peripheral wall portion through the multiple communication pipes has ascended along the heat insulating body peripheral wall portion and the outer peripheral wall portion, the pressure-medium gas flows out of the outer casing through the outer opening, further descends through between the inner peripheral surface of the high-pressure container and the outer peripheral wall portion, and flows again into the multiple introduction pipes.

* * * * *